May 5, 1931.  A. J. WEATHERHEAD, JR  1,803,577
SECTIONAL PIPE COUPLING
Filed April 13, 1927   2 Sheets-Sheet 1

Inventor
A. J. WEATHERHEAD JR.
By Fisher, Moser & Moore
Attorney

May 5, 1931. A. J. WEATHERHEAD, JR 1,803,577
SECTIONAL PIPE COUPLING
Filed April 13, 1927   2 Sheets-Sheet 2
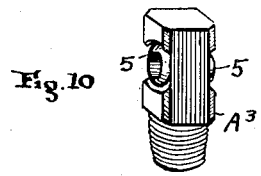
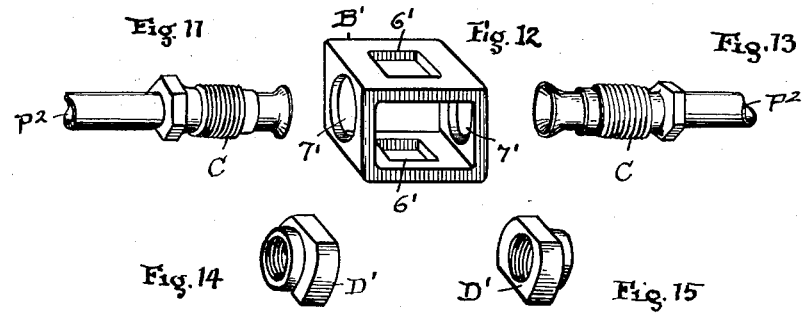
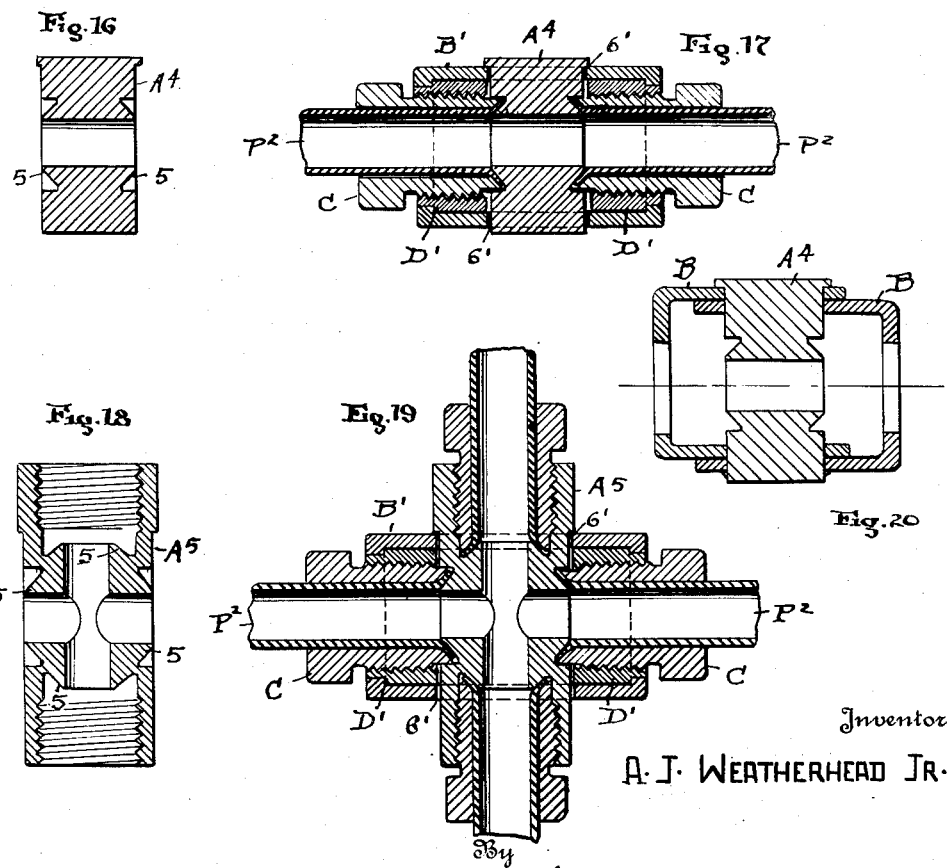
Inventor
A. J. WEATHERHEAD JR.

UNITED STATES PATENT OFFICE

ALBERT J. WEATHERHEAD, JR., OF CLEVELAND, OHIO

SECTIONAL PIPE COUPLING

Application filed April 13, 1927. Serial No. 183,374.

This improvement relates to sectional pipe couplings of the type shown and described in my applications for patent filed on even date herewith, Serial Nos. 183,372 and 183,373, and my object in the present instance is to provide a sectional pipe coupling which is in part adapted to be made by stamping and pressing operations and in part by automatic screw-machine operations, thereby facilitating and cheapening the manufacture of such couplings. Thus, in the present coupling I provide a yoke member made of sheet metal which is punch-pressed or stamped to the desired shape, and which is constructed to hold a separate collar or screw-threaded element for a pipe clamping nut. Such yokes and collars may be assembled with other sections to produce, quickly and conveniently, various kinds of fluid-tight couplings. That is to say either straight or angular pipe fittings may be readily produced from the present sectional structure, whereby one or more pipes may be connected to another part to or from which, a liquid or fluid is to be supplied or delivered, or whereby two or more pipes may be connected to each other. The present structure also lends itself to the making of a sectional coupling of small size and for pipes of small diameter, such as copper and brass pipe for gasoline, oil, compressed air, and vacuum connections.

Figure 2:
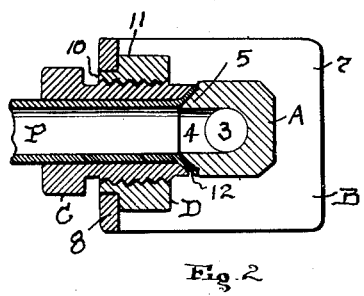
Figure 1:
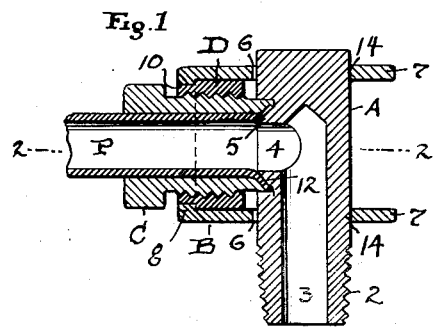
Figure 3:
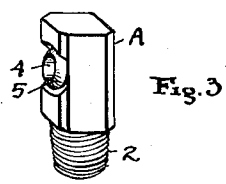
Figure 7:
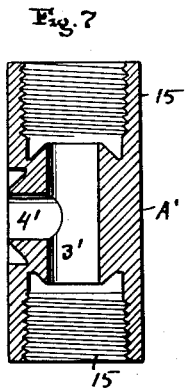
Figure 8:
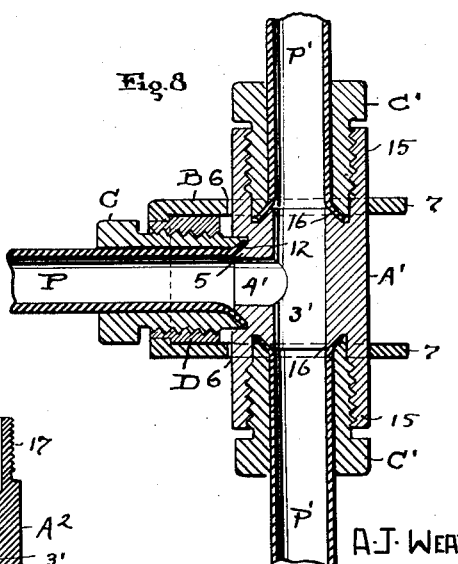
Figure 9:
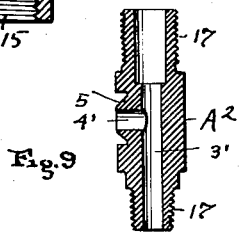

In the drawings annexed hereto, Fig. 1 is a sectional view of a pipe coupling or angle fitting embodying the present improvement, and Fig. 2 a horizontal section thereof on line 2—2 of Fig. 1. Figs. 3, 4, 5, and 6, are perspective views of the body, the coupling nut and pipe, the yoke, and the clamping collar, respectively. Fig. 7 is a sectional view, on an enlarged scale, of a modified form of body member, and Fig. 8 is a sectional view of this same member and the yoke coupled to three pipes. Fig. 9 is a sectional view, on a reduced scale, of another form of body member. Figs. 10 to 15 inclusive, on Sheet 2, are perspective views of the various elements of a modification of the invention; Fig. 10 representing the body member; Figs. 11 and 13, the separate nuts and pipes which are adapted to be clamped against the opposite sides of said body member; Fig. 12 the yoke member; and Figs. 14 and 15 the collars which are mounted within the yoke member for receiving and holding the nuts. Fig. 16 is a sectional view of a simple form of body member, and Fig. 17 a similar view of this member secured within a yoke member together with a pair of clamping collars, a pair of flanged pipes, and a set of nuts. Fig. 18 is a sectional view of a body member having intersecting passages and four sealing cones formed therein, and Fig. 19 is a sectional view of the same body member secured within a yoke member and connected to four flanged pipes. Fig. 20 is a sectional view of a body member secured within a yoke member composed of two pieces each of which corresponds in shape to the yoke member shown in Fig. 5.

Figures 4, 5, 6:
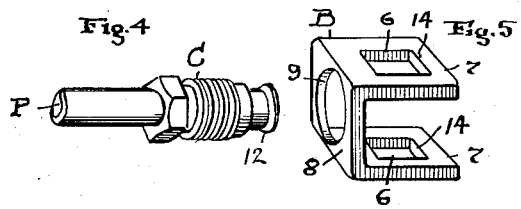

The present improvement comprises a body member A, a yoke B for member A made of strap or sheet metal, a tubular nut C for clamping a flanged pipe P against member A, and a screw-threaded collar D mounted within yoke B to receive nut C whereby the flanged end of pipe P may be clamped against body A and said body and yoke locked rigidly together. A simple aggroupment of such parts is exemplified in Figs. 1 and 2 of the drawings, body A being formed to provide an angle fitting or coupling for pipe P. Thus, body A is provided with a screw-threaded extension 2 to permit attachment to a receiving or distributing vessel or other appliance requiring a pipe connection, and a passage 3 extends through extension 2 to a cross port or lateral passage 4 in one side of the body. Lateral passage 4 extends through the center of a shallow truncated cone 5 which is formed within the side of the body, and body 2 may be made by screw-machine operations, using square or other angular-shaped rods cut to predetermined lengths. On the other hand yoke B may be blanked from sheet metal by punch press operations, and formed with registering openings 6—6 in two flat sides 7—7 thereof to receive flat-sided body A. Yoke B may also be pressed into U-shape as shown in Fig. 5, and the flat connecting portion or side 8 thereof may be formed with a round opening 9 adapted to be placed axially opposite cone 5 and passage 4 when body A and the yoke are sleeved together. Collar D has a round boss 10 adapted to fit within opening 9 in the yoke and the flanged or enlarged portion 11 of the collar is adapted to bear against the inner flat face of the connecting portion 8 of the yoke B. The edge of the flanged or enlarged portion 10 of collar D may be straight or flat to bear against the inner flat surfaces of the parallel sides or branches 7—7 when said collar is inserted into opening 9, thereby locking the collar against turning when tubular nut C is screwed into the collar. Pipe P extends through the nut and is formed with a flaring end flange 12 which is adapted to fit over cone 5 when pressed against it by the tip end of the nut, and which tip end may be formed with a flaring mouth to seat flaring flange 12 of the pipe. A tightly sealed joint is obtained by clamping this pipe flange against cone 5 by means of nut C, and the yoke is locked tightly upon body A at opposite ends thereof where the straight edges 14—14 of openings 6—6 engage one flat side of the body. The collar and nut may be produced by automatic screw machine operations as the sectional construction of the coupling or fitting permits quantity production of these parts with accuracy and economy in that way, including body member A. Moreover, the body member may be made in various forms and still permit assembly and use with other parts as described. In other words by substituting other forms of body members different types of couplings or fittings may be produced with the same yoke, nut and collar.

As an exemplification, see Figs. 7 and 8, wherein a body member A' is shown as having both ends 15—15 thereof open to a longitudinal passage 3' and to a lateral bore 4', and which open ends are screw-threaded internally to receive tubular nuts C'—C' whereby two flanged pipes P'—P' may be clamped against conical seats 16—16 internally of said body member. By inserting body member A' within a yoke B and using a collar D and a tubular nut C, a T fitting is obtained for a flanged pipe P, said body also having a conical seat 5 at its side surrounding the mouth of lateral bore 4'. In Fig. 9 I show a body member A² which is substantially the same as body A' except that its opposite ends 17—17 are screw-threaded externally instead of internally to permit attachment of body A² to a receptacle or to screw-threaded pipes.

Other modified forms of couplings or fittings for two or more pipes are shown in Figs. 10 to 19, inclusive, Sheet 2. These fittings comprise a four-sided yoke member B' having rectangular openings 6'—6' in two of its sides, and round openings 7'—7' in its remaining sides. Thus, a body member A³ such as shown in Fig. 10 may be inserted within openings 6'—6', or other body members A⁴ and A⁵ such as delineated in Figs. 16 and 18 may be introduced into this yoke member instead to permit two flanged pipes P²—P² to be coupled together by utilizing two tubular nuts C—C within a pair of screw-threaded collars D'—D' fitted within the round openings 7'—7' in the opposite ends or sides of yoke member B'. In all these figures, the same yoke member and two collars and two nuts are employed to clamp a body member within the yoke and to couple two pipes against two cones on opposite sides of the body. In Fig. 19, body member A⁵ is formed with four cones 5 to permit four flanged pipes to be coupled thereto, this body member corresponding otherwise to body A' shown in Fig. 7.

In Fig. 20 I show body member A⁴ sleeved within a pair of U-shaped yoke members B placed in overlapping relation and facing opposite directions to permit two screw-threaded collars D to be placed opposite the double cones for attachment of two flanged pipes by tubular nuts as illustrated in Fig. 17.

What I claim, is:

1. A sectional pipe coupling, comprising a body having a fluid passage, a yoke member sleeved upon said body having a side opening, a screw-threaded collar fitted within said side opening, and a tubular nut extending through said collar adapted to clamp the end of a pipe against said body in open communication with said passage.

2. A sectional pipe coupling, comprising a body having a fluid passage therein and formed with a conical seat open centrally to said passage, a yoke adapted to receive said body, a screw-threaded collar at one side of said yoke, a tubular nut connected with said collar, and a pipe having a flanged end adapted to be pressed by said nut against the conical seat on said body, thereby locking the body, yoke, collar and pipe together.

3. A sectional pipe coupling, comprising a body having a conical seat at one side thereof and a passage open to said seat, an angular-sided member formed of thin flat metal having openings in its sides adapted to receive said body, a screw-threaded element fitted within one side of said second member adapted to receive a nut, and a tubular nut within said element adapted to be sleeved over a pipe and to press a flanged end on said pipe against said conical seat, thereby locking all the fitted parts rigidly together.

4. A sectional pipe coupling, comprising a body having flat sides and a conical seat within one side and a passage centrally through said seat, a yoke member having parallel walls adapted to receive and hold said body from turning and provided with a side wall having an opening opposite said conical seat, a separate member fitted between the walls of said yoke having a screw-threaded opening axially co-incident with said conical seat, and a tubular nut extending through said screw-threaded opening, in combination with a pipe having a flanged end adapted to be clamped by said nut against said conical seat.

5. A sectional pipe coupling, comprising a body having a fluid passage, a yoke sleeved upon said body having an opening in its connecting portion, a collar interlocked with said yoke and formed with a screw-threaded opening, a tubular nut extending through the opening in said collar, and a flanged pipe extending through said nut and clamped thereby against said body in open communication with said passage.

6. A sectional pipe coupling, comprising a body having flat sides and a fluid passage, a yoke having parallel walls formed with rectangular openings adapted to receive said body and a connecting wall having an opening, a flanged collar removably seated in a non-rotatable position between the parallel walls of said yoke having a screw-threaded opening axially aligned with the fluid passage in said body, and a tubular nut extending through said collar adapted to clamp a flanged pipe in sealing connection with said body opposite said passage.

In testimony whereof I affix my signature.

ALBERT J. WEATHERHEAD, Jr.